US008718881B2

(12) United States Patent
Bixel et al.

(10) Patent No.: US 8,718,881 B2
(45) Date of Patent: May 6, 2014

(54) FUEL EFFICIENT CRANE SYSTEM (75) Inventors: Paul S. Bixel, Salem, VA (US); Marcelo Andres Lara, Salem, VA (US)

(73) Assignee: TMEIC Corporation, Roanoke, VA (US)

( * ) Notice: Subject to any disclaimer, the term of this patent is extended or adjusted under 35 U.S.C. 154(b) by 288 days.

(21) Appl. No.: 13/319,105

(22) PCT Filed: Sep. 11, 2009

(86) PCT No.: PCT/US2009/056646
§ 371 (c)(1),
(2), (4) Date: Nov. 7, 2011

(87) PCT Pub. No.: WO2011/031267
PCT Pub. Date: Mar. 17, 2011

(65) Prior Publication Data
US 2012/0059555 A1   Mar. 8, 2012

(51) Int. Cl.
*H02P 25/30*   (2006.01)

(52) U.S. Cl.
USPC ............ 701/50; 318/140; 318/141; 318/146; 318/148; 318/151; 318/157; 701/53; 701/54; 701/56

(58) Field of Classification Search
None
See application file for complete search history.

(56) References Cited

U.S. PATENT DOCUMENTS

| 6,177,738 | B1 * | 1/2001 | Hentunen et al. | 307/67 |
| 7,378,808 | B2 * | 5/2008 | Kuras et al. | 318/139 |
| 8,039,991 | B2 * | 10/2011 | Wakitani et al. | 307/80 |
| 8,560,183 | B2 * | 10/2013 | Colwell et al. | 701/50 |
| 2005/0072608 | A1 * | 4/2005 | Johnston et al. | 180/65.2 |
| 2005/0140142 | A1 * | 6/2005 | Welches et al. | 290/41 |
| 2006/0001397 | A1 | 1/2006 | Ahmad et al. | |
| 2006/0102578 | A1 | 5/2006 | Zakula et al. | |
| 2007/0272904 | A1 * | 11/2007 | Johnston et al. | 254/2 R |
| 2008/0080213 | A1 * | 4/2008 | Zhang | 363/37 |
| 2008/0157540 | A1 * | 7/2008 | Fattal | 290/40 R |

(Continued)

FOREIGN PATENT DOCUMENTS

| WO | 2006028422 A1 | 3/2006 | |
| WO | 2008099055 A1 | 8/2008 | |
| WO | WO 2008099055 A1 * | 8/2008 | H02P 9/30 |

OTHER PUBLICATIONS

Co-Pending Application No. JP 2012-528780, Response to Office Action 1 and Translation, dated Dec. 17, 2013, 5 pages.

(Continued)

*Primary Examiner* — Jonathan M. Dager
(74) *Attorney, Agent, or Firm* — New River Valley IP Law, PC; Michele L. Mayberry (57) ABSTRACT A system and method for efficiently regulating the fuel consumption of a variable speed combustion engine used to control loads such as a hoist motor in a mobile gantry crane based on load motor speed commands issued by a crane operator. The system and method can rely on a programmable logic controller to issue engine fuel commands to regulate engine speed based on interpolations derived from data representing the relationship between load motor voltage and engine speed and data representing the relationship between engine speed and engine power capacity. The method may also be used in modified form by combustion engines which need digital fixed speed commands.

13 Claims, 6 Drawing Sheets

(56) References Cited

U.S. PATENT DOCUMENTS

| | | | |
|---|---|---|---|
| 2010/0097016 A1* | 4/2010 | Vainonen et al. | 318/152 |
| 2010/0142234 A1* | 6/2010 | Abolhassani et al. | 363/41 |
| 2011/0025143 A1* | 2/2011 | Scott et al. | 310/52 |
| 2011/0050174 A1* | 3/2011 | King et al. | 320/134 |
| 2011/0093150 A1* | 4/2011 | Yanagisawa et al. | 701/22 |
| 2011/0147130 A1* | 6/2011 | Oggianu et al. | 187/290 |
| 2011/0204854 A1* | 8/2011 | King et al. | 320/163 |
| 2012/0023922 A1* | 2/2012 | Renner et al. | 60/420 |
| 2012/0023923 A1* | 2/2012 | Peters et al. | 60/431 |
| 2012/0029775 A1* | 2/2012 | Peters et al. | 701/50 |
| 2012/0035815 A1* | 2/2012 | Kawashima et al. | 701/50 |
| 2012/0089287 A1* | 4/2012 | Nishiyama | 701/22 |
| 2012/0130576 A1* | 5/2012 | Sugiyama et al. | 701/22 |
| 2013/0125540 A1* | 5/2013 | Vainonen et al. | 60/413 |
| 2013/0261904 A1* | 10/2013 | Linstroth et al. | 701/50 |

OTHER PUBLICATIONS

Co-Pending Application No. JP 2012-528780, Office Action 1 Translation, dated Sep. 17, 2013, 4 pages.

Co-Pending Application No. JP 2012-528780, Office Action 1, dated Sep. 17, 2013, 4 pages.

International Application No. PCT/US09/056646, International Preliminary Report on Patentability, Mar. 13, 2012.

International Application No. PCT/US09/056646, International Search Report, Aug. 26, 2011.

International Application No. PCT/US09/056646, Written Opinion, Aug. 26, 2011.

P. Van Tichelen and D. Weyen, "Optimized Use of an Internal-Combustion Engine with a Variable-Speed Synchronous Generator and Rectifier". IEEE Proceedings on Power Electronic Drives and Energy Systems for Industrial Growth. vol. 2 pp. 659-664. Dec. 1-3, 1998.

* cited by examiner

FUEL EFFICIENT CRANE SYSTEM

CROSS-REFERENCE TO RELATED APPLICATIONS

The present application is a National Stage application under 35 USC §371 of Application No. PCT/US09/56646, filed Sep. 11, 2009, the disclosure of which is hereby incorporated by reference herein in its entirety.

TECHNICAL FIELD

The subject invention relates generally to a system for providing a fuel efficient crane system. More specifically, the system permits variable speed operation of a crane system generator used to provide fuel savings by relying on a diode converter to supply the main DC bus of the system.

BACKGROUND OF THE INVENTION

Mobile crane systems often rely on combustion engines (CE) coupled to AC generators in order to supply the energy needed to operate. It is advantageous to operate such systems in the most efficient manner possible in order to minimize fuel costs and pollution. It is the nature of these systems that the power demanded of the generator varies widely over a period of time. For a very large percentage of the time, relatively small amounts of power are needed, but when the time comes to lift the load, a large surge in power is required. The generator system selected must be rated to meet the peak demand requirement. As a result, for a large percentage of the time in use, the generator system is operating much below its design rating.

The efficiency of a generator system is determined by its design and operating point. As regards design, larger systems have higher losses and higher efficiencies when losses are stated in kW and efficiencies are stated as a percentage. Once a system is selected, however, the only way to optimize efficiency is to control the operating point at which the system is operated. In any generator system, losses increase with the rotational speed of the system. Therefore, efficiency is optimized by operating the system at the lowest possible speed that will allow production of the required power.

In systems used by mobile cranes, the electrical loads attached to the AC generator system include a converter supplying a DC bus with one or more inverters attached. Each inverter in turn supplies power to the different motors of the crane system. Finally, auxiliary AC loads must be accounted for which control, for example, lights, crane cabin controls and air conditioners.

Figure 1:
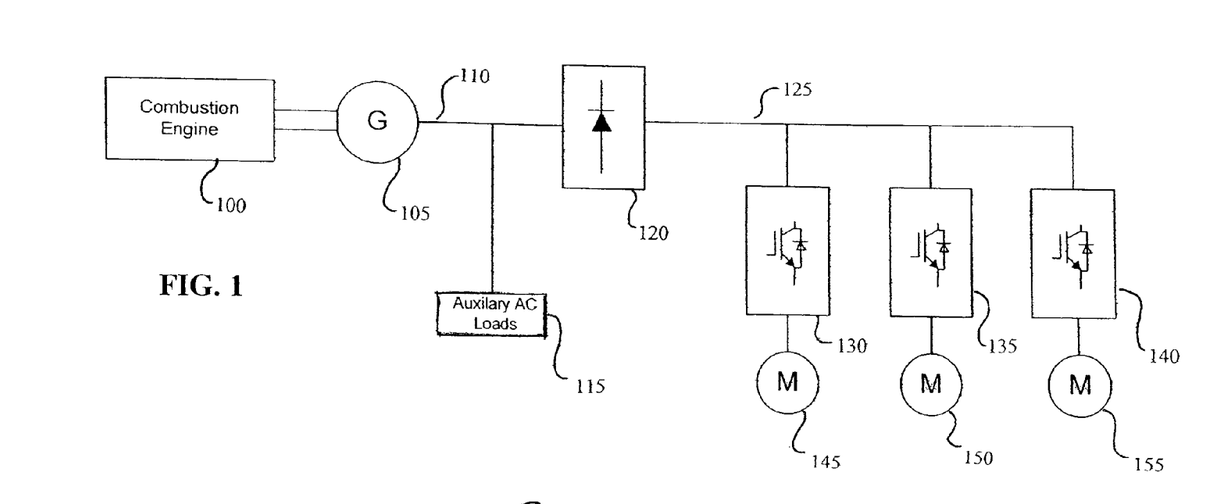
FIG. 1 is a schematic diagram of a known one-line traditional system in which a generator for a mobile crane is operated at a constant speed.

In the traditional system, the generator is operated at a constant speed in order to provide a constant voltage and frequency to the load. Having a constant speed and voltage greatly simplifies the design of the electrical system and allows it to be operated in a straight forward manner. This approach leads on the one hand to the lowest initial cost and high performance but on the other hand to lower efficiency. A schematic diagram of a one-line diagram of this type of system is shown in FIG. 1. In this system, the DC bus voltage is directly dependent on the AC bus voltage as indicated by the formula DC=AC (line-line rms)×1.35. Combustion engine 100 is coupled to generator 105 which supplies power along an AC bus 110 to auxiliary loads 115 and through diode converter 120 along a DC bus 125 to inverters 130, 135 and 140 which are connected, respectively, to loads such as hoist motor 145, gantry motor 150 and trolley motor 155.

Figure 2:
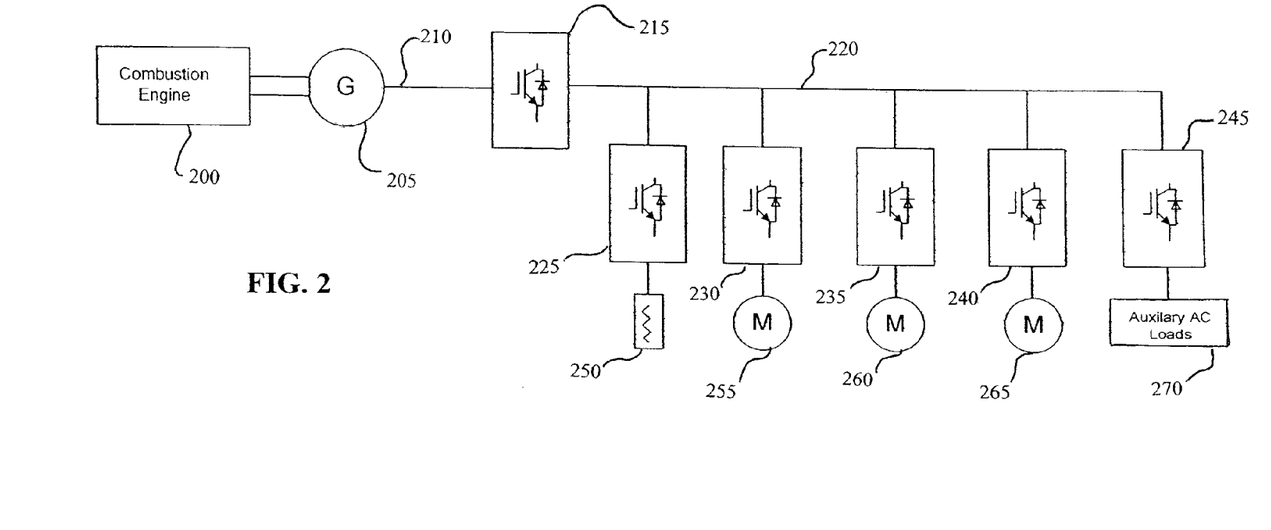
FIG. 2 is a schematic diagram of a known one-line system in which the generator frequency and voltage are decoupled from the DC bus voltage.

An improvement on the traditional system for use in more complex systems is available in which the generator frequency and voltage is decoupled from the DC bus voltage. In these systems, an active converter operating solid state switches under PWM control maintains the DC bus voltage at the rated level regardless of the generator speed (and AC bus voltage). In such systems, a separate inverter is provided to supply the auxiliary loads with the constant voltage and frequency they need. This system offers improved efficiency over the traditional one but increases the initial cost by requiring the active converter to function as a separate inverter to supply auxiliary loads. A controller is included which determines the required engine speed by computing the total power required by all the connected loads. FIG. 2 provides a schematic diagram of a one-line system of this type. In this variation, combustion engine 200 is coupled to generator 205 which supplies power along AC bus 210 to active IGBT converter 215 and further supplies power along DC bus 220 to separate inverters 225, 230, 235, 240 and 245 which are connected, respectively, to loads such as resistor bank 250 which functions as a dynamic braking resistor to dissipate excess energy, hoist motor 255, gantry motor 260, trolley motor 265 and auxiliary loads 270.

What is needed is a fuel efficient crane power system with lower initial set-up and running costs and higher long-term reliability than any currently available.

SUMMARY OF THE INVENTION

The present invention relates to a system and method for use with a crane to produce varying AC voltage to control at least one load. The engine is coupled to a generator the varying AC output voltage of which is converted by a diode converter into varying DC voltage delivered along a DC bus line to separate inverters each connected by a separate AC bus line to a separate load. A master controller may be used to manage the speed of the engine and the power delivered by each inverter to the respective load to which that inverter is connected in response to speed change commands input into the master controller by an operator. The method relates a way to provide power from a variable speed combustion engine to loads on a crane. The method uses motor load speed to generate a first engine speed command and load power requirements to generate a second engine speed command. The higher of the first and second engine speed commands is selected as the actual engine speed command and used as a basis for issuing an engine fuel command to the engine. Alternatively, a method for issuing digital fixed speed commands is also disclosed.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE INVENTION

Figure 3:
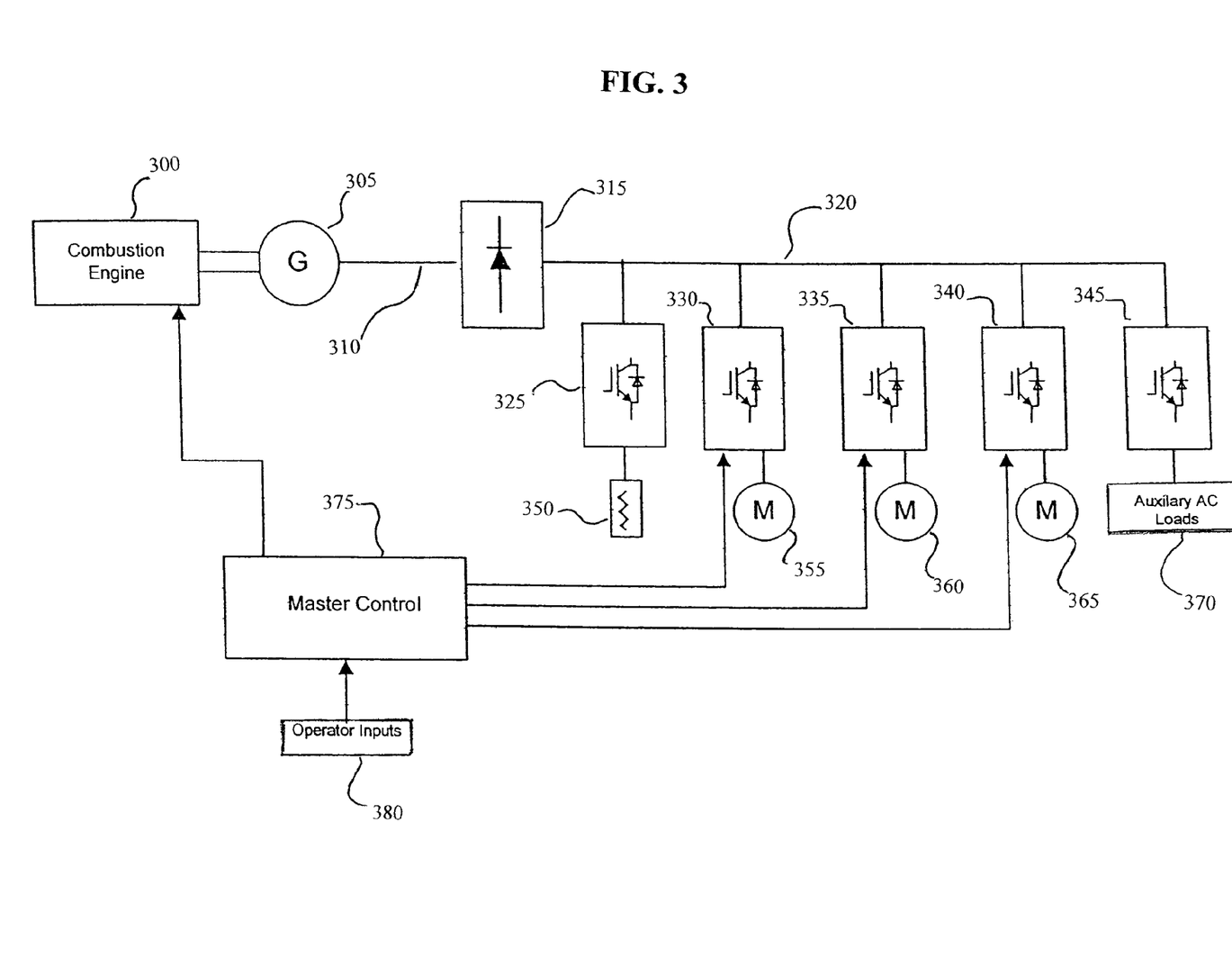
FIG. 3 is a schematic diagram of the basic components of the system of this invention.

The system of this invention combines components of the systems of the prior art discussed above and adds a master controller device to achieve a goal of allowing the AC and DC bus voltages to vary according to the generator speed and controlling the generator speed optimally such that the required voltage and power are only provided when needed. FIG. 3 presents a schematic diagram of the components of this new system in which combustion engine 300 is coupled by a solid shaft to generator 305 which supplies power along AC bus 310 to diode converter 315 and further supplies power along a common DC bus 320 to separate inverters 325, 330, 335, 340 and 345 which are connected, respectively, to loads such as dynamic resistor bank 350 or a similar load for dissipating or storing excess energy, hoist motor 355, gantry motor 360, trolley motor 365 and auxiliary loads 370. In another variation multiple diode converters are supplied each with one or more inverters attached. Inverters 325, 330, 335, 340 and 345 and diode converter 315 may be of any kind known in the art so long as their specifications are capable of handling the requirements of the loads to which they are connected. Master control 375 issues command instructions to combustion engine 300 and to those inverters connected to motorized loads such as hoist motor 355, gantry motor 360 and trolley motor 365 in response to operator inputs 380. These instructions function to control the speed of generator 305 within a range between the idle speed of combustion engine 300 and its rated speed.

Consequently, the voltage and frequency of AC bus 310 also varies within the same range. Furthermore, use of diode converter 315 causes the voltage of DC bus 320 to also vary within that same range. Since the power available from engine 300 is directly related to its operating speed, two problems are presented. First, the speed of engine 300 must be regulated to achieve the desired power. Second, at any given voltage on DC bus 320, there is a limit on the maximum AC output voltage any inverter such as 330, 335 and 340, can develop and, therefore the maximum speed of any motor, such as 355, 360 and 365 connected to that inverter. This second factor also requires regulation of the speed of engine 300 such that the required output voltage can be achieved.

Master Control 375 resolves these two problems.

Figure 4:
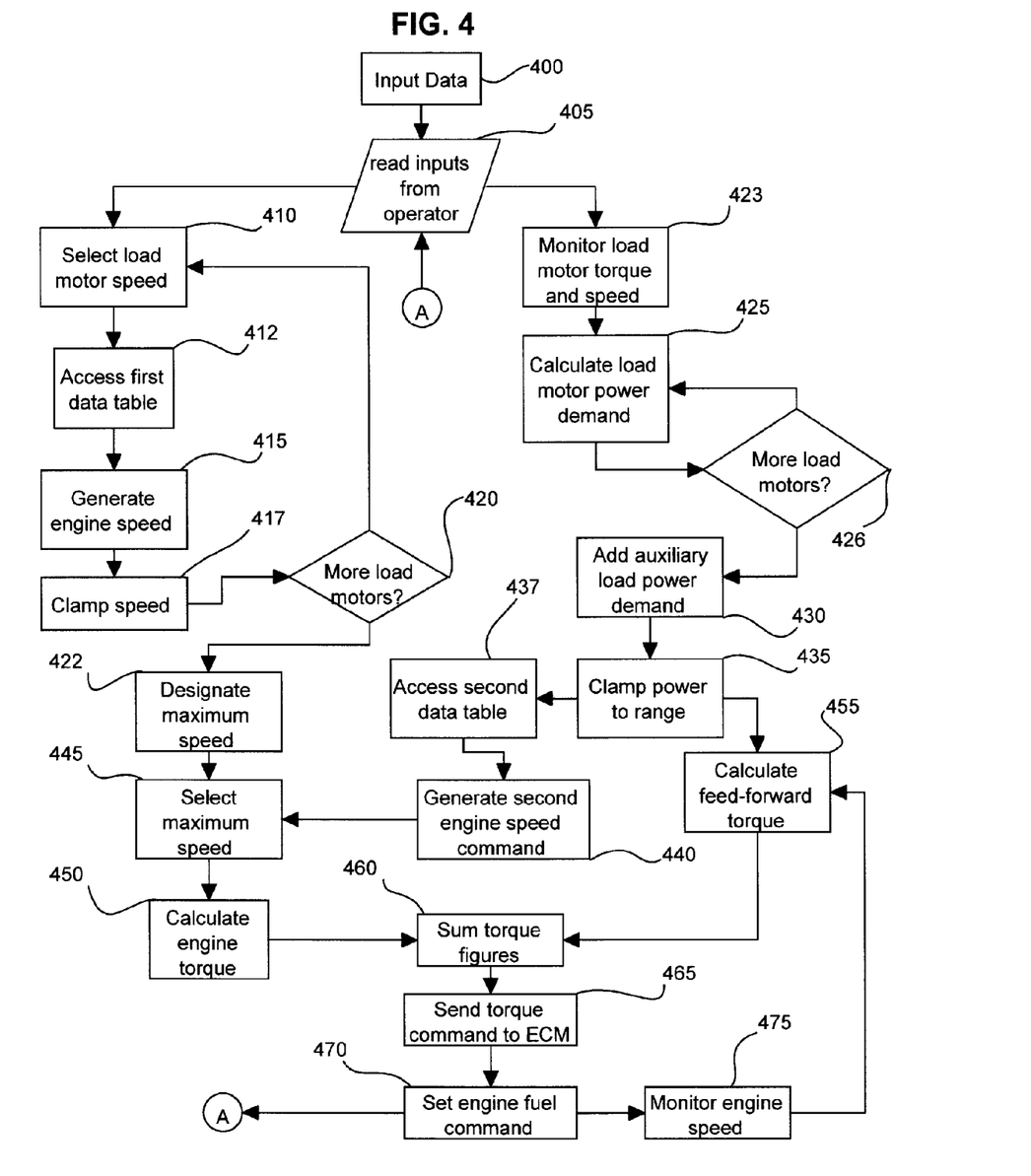
FIG. 4 is a schematic diagram of the process by which the master control of this invention operates.

A master control system may be used to manage the speed of engine 300 such that demands for both speed and power delivered to load motors 355, 360 and 365 can be satisfied. FIG. 4 is a schematic diagram of the process by which master control 375 satisfies these functions. At 400, data tables and data relating to the speed, power and torque ratings, as appropriate, of engine 300, generator 305, load motors 355, 360 and 365 and auxiliary loads 370 are loaded into and stored in a programmable logic controller. An off-the-shelf type of known programmable logic controller which is interfaced with an engine control module may be used to perform all of the operations described below. The crane operator calls for a speed change in one or more of the load motors 355, 360 and 365 at 405 by generating a command calling for such changes The speed of each respective load motor is selected at 410 in order to satisfy the operator. A first interpolator accesses a stored first data table at 412 in order to select a first appropriate speed for engine 300 at 415 based on the speed of the load motor. The selected speed is subject to clamping at 417 such that it falls between a low limit, such as the engine idle speed, and a high limit, such as the highest rated engine speed, although different low and high limits may be optionally chosen. For example, if the load motor controls a hoist and the hoist is being lowered, the load motor speed becomes negative so that the respective required engine speed is equal to its low limit which is typically its idle speed. This function is repeated for all motors sharing the same DC bus by determining at 420 whether a speed for all load motors has been selected. The maximum engine speed selected for any of the load motors is then designated at 422 as a first engine speed command Linear interpolation of data table values is used for this function as such a table is easily adjusted in the field and a closed form solution is often complex. The first data table in this case reflects the fundamental relationship between the load motor voltage needed at any speed and the engine speed. For example, the hoist voltage may go from zero to the highest rated voltage as the motor accelerates to 50% of its top speed. This is sometimes known as the base speed of the motor. Then from base speed to top speed the voltage requirement remains relatively flat. The load motor torque for each motor is monitored together with the selected motor speed at 423 in order to calculate the load motor power demand at 425 according to the formula Power=Torque×Speed. After torque is calculated for each load motor, as determined at 426, the load motor power demand for all motor loads connected to the same DC bus is added to the power required by the auxiliary AC loads 370 in order to obtain a total power demand at 430. This total power demand is clamped to between a maximum and a minimum power level range at 435 which is derived from the rated power capacity of engine 300. A second interpolator accesses a second stored data table at 437 in order to select a second appropriate speed for engine 300 at 440. The data in this second data table represents the relationship between engine speed and engine power capacity which are inherent qualities of engine 300. An actual speed for engine 300 is determined at 445 by selecting the higher of the first engine speed and the second engine speed. An engine torque figure is simultaneously calculated from the engine speed command at 450 by a proportional integral regulator based on the speed request output from 445. This figure is added at 460 to a torque calculation made at 455 according to the formula Torque =Power/Speed which is fed forward for this purpose. The final torque command is then sent to an engine control module at 465 and used to set and issue the engine fuel command at 470. Actual engine speed is monitored at 475 and then fed back to be used as updating data at 455 in calculating torque. The process then returns to 405 to await further operator commands.

Figure 5:
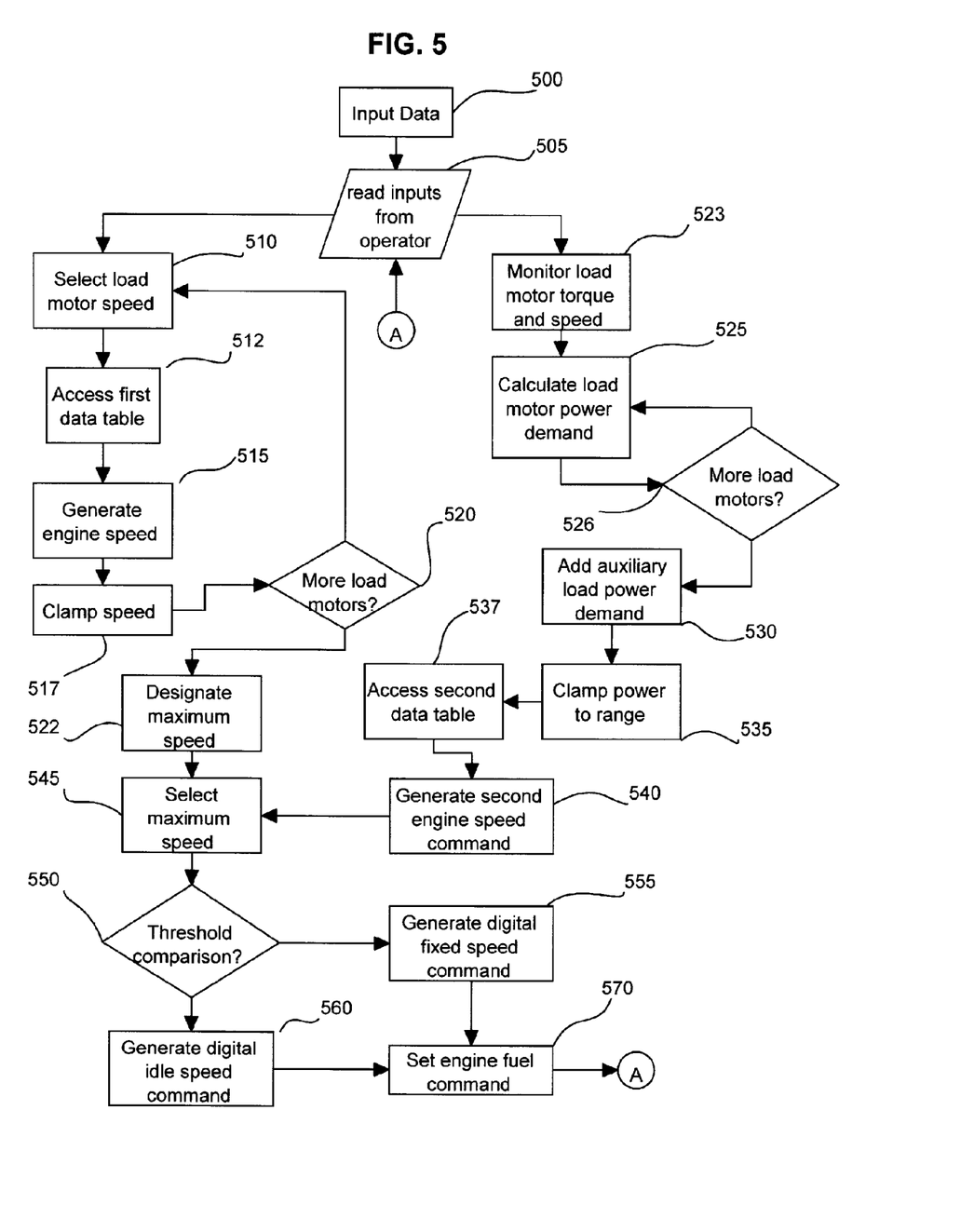
FIG. 5 is a schematic diagram of an alternative process by which the master control of this invention operates.

Some combustion engines cannot accept a continuously variable torque or speed command due to the simplicity of their engine control or their mechanical design. Systems controlling such engines will sometimes accept one or more digital inputs which correspond to one or more fixed speeds. In these cases it is necessary to modify the master control 375 so that it activates digital speed commands based on the commanded speed. FIG. 5 presents a schematic diagram of the process by which the operation of master control 375 can be modified to meet this requirement. At 500, data tables and data relating to the speed, power and torque ratings, as appropriate, of engine 300, generator 305, load motors 355, 360 and 365 and auxiliary loads 370 are loaded into and stored in a programmable logic controller. As in the case of the embodiment of FIG. 4, an off-the-shelf type of known programmable logic controller which is interfaced with an engine control module may be used to perform all of the operations described below. The crane operator calls for a speed change in one or more of the load motors 355, 360 and 365 at 505. The speed of each respective load motor is selected at 510 in order to satisfy the operator. A first interpolator accesses the same stored first data table at 512 as in FIG. 4 in order to select a first appropriate speed for engine 300 at 515 based on the speed of the load motor. Also as in the case of the embodiment of FIG. 4, the selected speed is subject to clamping at 517 on the same basis. This function is repeated for all motors sharing the same DC bus by determining at 520 whether a speed for all load motors has been selected. The maximum speed selected for any of the load motors is then designated at 522. The load motor torque for each motor is monitored together with the selected load motor speed at 523 in order to calculate the load motor power demand at 525 according to the formula Power=Torque×Speed. After torque is calculated for each load motor, as determined at 526, the load motor power demand for all motor loads connected to the same DC bus is added to the power required by the auxiliary AC loads 370 in order to obtain a total power demand at 530. This total power demand is clamped to between a maximum and a minimum power level range at 535 which is derived from the rated power capacity of engine 300. At 537, a second interpolator accesses a second stored data table in order to select a second appropriate speed for engine 300 at 540. The data in this second data table represents the relationship between engine speed and engine power capacity which are inherent qualities of engine 300. An actual speed for engine 300 is determined at 545 by selecting the higher speed command to optimize efficiency based on a comparison of the speed command sent by the first interpolator and that sent by the second interpolator. A threshold comparison is performed at 550 to determine whether the selected speed command is greater than the idle speed of engine 300 or any of the other available speed points. If so, that selected speed is converted into a digital fixed speed command at 555 and, if equal to or less than the idle speed, the engine idle speed is converted into a digital fixed speed command at 560. In either case, the digital command is sent to the engine control module and used to set and issue the engine fuel command at 570. The process then returns to 505 to await further operator commands.

The system and method of this invention can be further optimized by considering the generator field excitation control. The output voltage of the generator is the product of its rotational speed and the flux produced in the machine by the generator field. It is customary for the generator to include a controller which regulates the field current. The field current controller can be used to increase the generator output voltage in order to partially compensate for the lower speed operation of engine 300. While it usually is not possible to completely compensate for the lower operating speed, it is typically possible to increase voltage up to 20% at any speed which is still advantageous as it relieves some of the constraint on master control 375 as it seeks the lowest possible speed for the combustion engine.

One further issue remains to be resolved. Auxiliary AC load 370 must be supplied with a fixed or nearly fixed AC voltage by inverter 345 in order to operate properly. However, inverters which are controlling their output voltage rather than current, as is the case for inverter 345, are faced with a problem in this regard. The output voltage of inverter 345 is generally determined by the equation $V_{ac\_out}=m*\sqrt{(3/2)}*V_{dc}/2$. In this equation $V_{dc}$ is the voltage of the DC bus and "m" is the modulation index presented to the pulse width modulator incorporated in inverter 345. This formula expresses the function of the hardware in that it can create an output voltage based on a DC voltage and a modulation index. In most voltage source inverters, the DC bus voltage is fixed or nearly so. Consequently, their output voltage is directly determined by the modulation index created in the inverter. In the case of the systems disclosed above, the DC bus voltage is varying causing an undesirable variation effect on the output AC voltage of the inverter. There are three alternative solutions to this problem.

Figure 6:
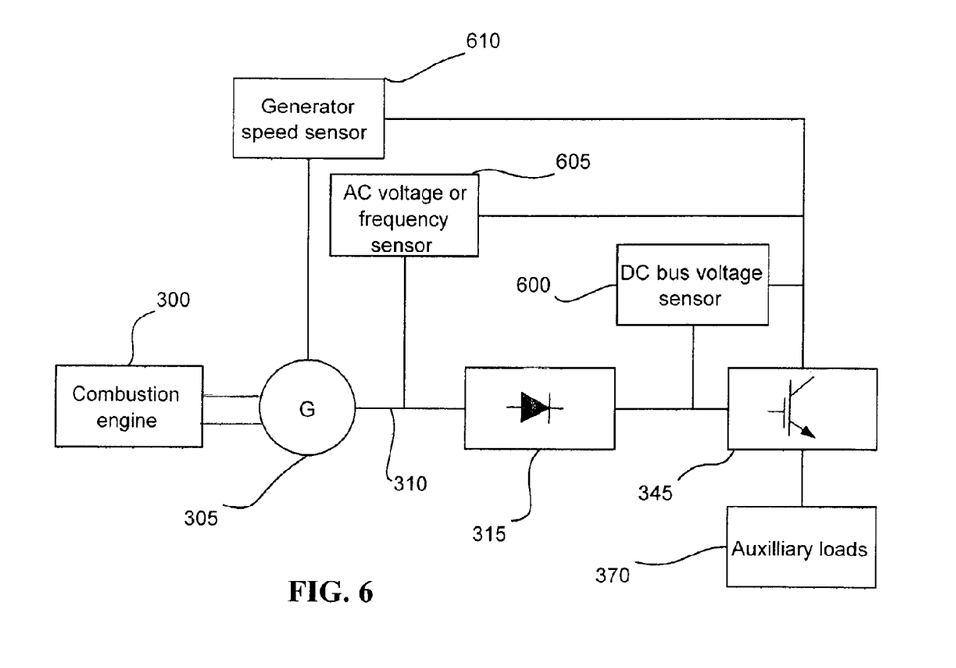
FIG. 6 is a simplified schematic diagram of a first arrangement for providing nearly constant AC voltage to auxiliary loads connected to a mobile crane.
Figure 7:
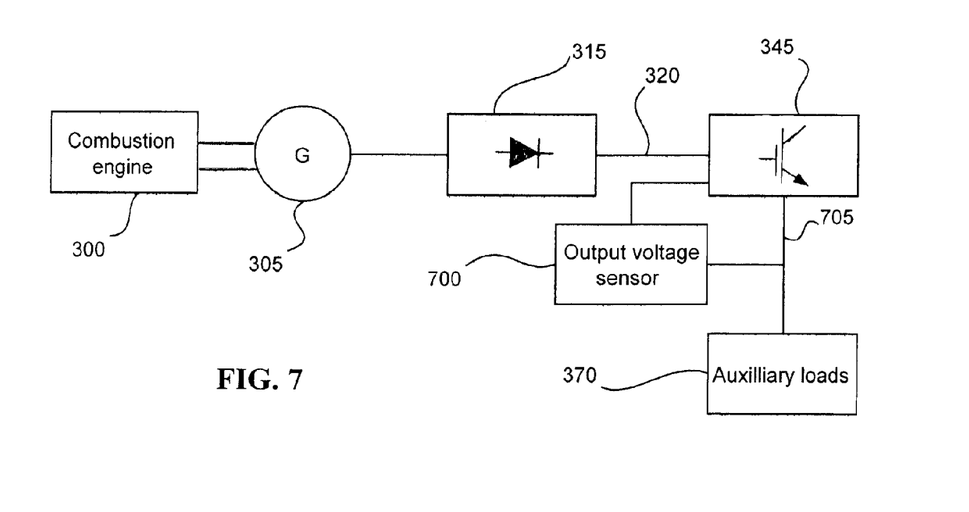
FIG. 7 is a simplified schematic diagram of a second arrangement for providing nearly constant AC voltage to auxiliary loads connected to a mobile crane.
Figure 8:
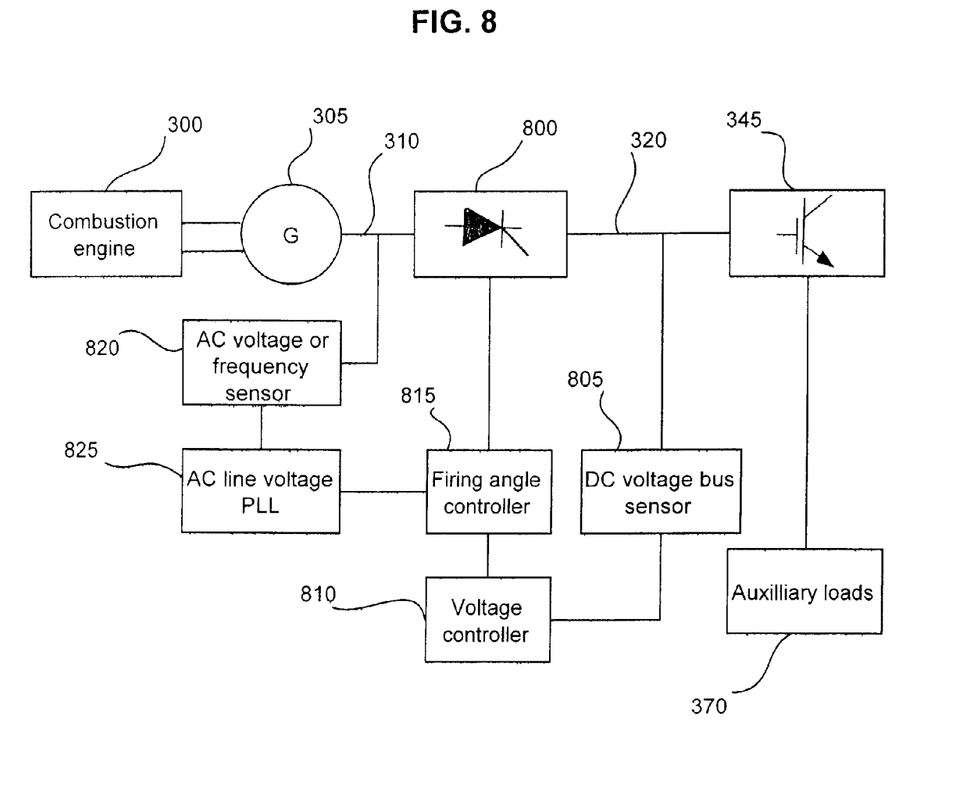
FIG. 8 is a simplified schematic diagram of a third arrangement for providing nearly constant AC voltage to auxiliary loads connected to a mobile crane.

FIG. 6 illustrates in simplified schematic diagram form a first arrangement for providing nearly constant AC voltage output from inverter 345. This diagram eliminates depiction of all of the other inverters, loads and the master control shown in FIG. 3 but otherwise applies to that system. The diagrams presented below in FIGS. 7 and 8 are similarly simplified. In this approach, the desired AC voltage output from inverter 345 is used as a reference voltage which is divided by a feedback signal from sensor 600 representing the variable DC bus voltage in order to create a normalized modulation index to present to the modulator inherent in inverter 345. Alternatively, any other signal which is proportional to the DC bus voltage may be used such as AC input voltage or AC input frequency from optional sensor 605 or the speed of generator 305 from optional sensor 610.

FIG. 7 illustrates in simplified schematic diagram form a second arrangement for providing nearly constant AC voltage output from inverter 345. In this approach, output voltage sensor 700 is installed at the output of inverter 345 to detect the AC output voltage 705 directly. This data is then supplied to the voltage controller of inverter 345 in order to automatically adjust the modulation index of inverter 345 as the DC bus voltage changes.

FIG. 8 illustrates in simplified schematic diagram form a third arrangement for providing nearly constant AC voltage output from inverter 345. In this approach, DC bus voltage 320 is fixed at its lowest level according to the minimum voltage of AC bus 310 by use of thyristor 800. DC bus voltage 320 would be detected by DC voltage bus sensor 805 and fed back to voltage controller 810 to be compared against a DC bus voltage reference which represents the desired DC bus voltage. Voltage controller 810 issues a DC bus voltage command to thyristor firing angle controller 815. Simultaneously, sensor 820 detects either the AC voltage or frequency of AC bus 310 and sends that data to AC line voltage phase locked loop (PLL) 825. Firing angle controller 815 combines the data from PLL 825 and voltage controller 810 to issue a firing angle command to thyristor 800 For example, if the minimum AC line-to-line voltage is $V_1$ then the DC bus voltage would be fixed at approximately $DC=1.357*V_1$. In this case the firing angle of thyristor converter 800 would be fully advanced. Then, as the AC voltage began to rise, the firing angle would be retarded in order to maintain a constant DC bus voltage. With the constant DC bus voltage the inverter modulation index becomes essentially constant as well.

The control system described above can be applied to hydraulic systems as well as electrical systems. In the hydraulic system, generator 305 is replaced with a pump and load motors 355, 360 and 365 are replaced with hydraulic motors. In such systems, the maximum speed of the hydraulic motor is limited by the available hydraulic pressure. The electrical and hydraulic systems are analogous in that the controller must select the engine speed based on the load power required and the maximum speed of any of the connected load motors.

The system described above may also be implemented in a variety of variations including a plurality of the elements disclosed. Thus, one or more engines 300 could be coupled to one or more generators 305 producing AC voltage on one or more AC bus lines 310 connected to one or more diode converters 315 providing DC voltage along one or more DC bus lines 320 to one or more loads of the types described above.

The foregoing invention has been described in terms of the preferred embodiment. However, it will be apparent to those skilled in the art that various modifications and variations can be made to the disclosed apparatus and method without departing from the scope or spirit of the invention. The specification and examples are exemplary only, while the true scope of the invention is defined by the following claims.

What is claimed is:

1. A system for use with an operator supervised crane enabling a variable speed combustion engine to produce varying AC voltage to control at least one load comprising:
    a variable speed generator directly coupled to and driven directly by the engine having a speed corresponding to the speed of the engine and producing a variable AC voltage output;
    a first AC bus line connected on one end to the output of said generator;
    a diode converter producing a variable DC voltage having an input and an output wherein the input thereof is connected to the opposing end of said first AC bus line;
    a variable voltage DC bus line connected on one end to the output of said diode converter;
    at least one inverter each having at least one input and an output wherein an input of each one thereof is connected to said variable voltage DC bus line;
    at least one second AC bus line each of which is separately connected on one end to the output of a separate one of said at least one inverter; and
    at least one variable speed motor load each of which is connected to the opposite end of one of said separate second AC bus lines.

2. The system of claim 1 further comprising master control means for managing the speed of the engine and for controlling the power delivered to each of said at least one motor loads along the respective at least one separate second AC bus line to which each of said at least one motor load is connected wherein said master control means is connected to the engine and to an input of each of said at least one inverter and wherein further said master control means is responsive to operator inputs.

3. The system of claim 1 further comprising braking means for dissipating or storing excess energy connected through a separate second AC bus line to the output of one of said at least one inverter.

4. The system of claim 1 further comprising:
    an auxiliary load connected to one end of one of the at least one separate second AC bus line wherein said auxiliary load has a known requirement for constant or nearly constant voltage delivery in order to function properly; and
    constant voltage regulating means for ensuring that said auxiliary load is supplied with constant or nearly constant voltage from the inverter to which said auxiliary load is connected through said second AC bus line.

5. The system of claim 1 wherein one of said motor loads is a hoist motor.

6. A method for controlling the speed of a variable speed combustion engine directly coupled to a generator providing power along a DC bus to a motor load on a crane wherein data representing the relationships between motor voltages and engine speeds and between engine speeds and engine power capacities is known, comprising:
    selecting a motor load speed;
    generating a first engine speed command based on interpolation of data representing the relationship between motor voltages of the motor load and engine speeds;
    determining the power required by the motor load;
    further generating a second engine speed command based on interpolation of data representing the relationship between engine speeds and engine power capacities;
    choosing the higher of the first engine speed command and the second engine speed command;
    issuing an engine fuel command to the engine based on the chosen engine speed command; and
    thus selecting the minimum engine speed required to produce the minimum DC voltage and power required to operate the motor load at said selected motor load speed, wherein further the motor load operates at a variable speed and the power is provided along a variable voltage DC bus to the variable speed motor load.

7. The method of claim 6 wherein generating is followed by:
    clamping said first engine speed command to within a predetermined range.

8. The method of claim 6 wherein determining is followed by:
    further clamping said power to within a predetermined range.

9. The method of claim 6 wherein choosing is followed by:
    further determining engine torque based on the chosen engine speed command.

10. A method for controlling the speed of a variable speed combustion engine directly coupled to a generator providing power along a DC bus to at least one motor load on a crane wherein data representing the relationships between motor voltages and engine speeds and between engine speeds and engine power capacities is known and a speed change has been requested for at least one of the motor loads, comprising:
    selecting motor speeds for each of the at least one motor load to satisfy the speed change request;
    generating an engine speed command for each of the at least one motor load based on interpolation of data representing the relationship between motor voltages of the motor load and engine speeds;
    clamping each engine speed command to within a predetermined range;
    designating the highest of the engine speed commands as the first engine speed command;
    determining the total power required by all of the at least one motor load;
    further generating a second engine speed command based on interpolation of data representing the relationship between engine speeds and engine power capacities;
    choosing the higher of the first engine speed command and the second engine speed command;
    issuing an engine fuel command to the engine based on the chosen engine speed command; and
    thus selecting the minimum engine speed required to produce the minimum DC voltage and power required to operate the at least one motor load at each of said selected motor load speeds,
    wherein further each motor load operates at a variable speed and the power is provided along a variable voltage DC bus to each variable speed motor load.

11. The method of claim 10 wherein generating is followed by:

clamping each engine speed command to within a predetermined range.

12. The method of claim 10 wherein determining is followed by:
further clamping the total power for all of the at least one motor loads to within a predetermined range.

13. The method of claim 10 wherein choosing is followed by:
further determining engine torque based on the chosen engine speed command.

* * * * *